United States Patent
Wong

(10) Patent No.: US 8,427,099 B2
(45) Date of Patent: Apr. 23, 2013

(54) MONITOR FOR CHARGING SERIES CONNECTED BATTERIES

(75) Inventor: Yee Chin Wong, Tucson, AZ (US)

(73) Assignee: Haemonetics Corporation, Braintree, MA (US)

( * ) Notice: Subject to any disclaimer, the term of this patent is extended or adjusted under 35 U.S.C. 154(b) by 386 days.

(21) Appl. No.: 12/564,317

(22) Filed: Sep. 22, 2009

(65) Prior Publication Data

US 2012/0038315 A1 Feb. 16, 2012

Related U.S. Application Data

(60) Provisional application No. 61/101,591, filed on Sep. 30, 2008.

(51) Int. Cl.
*H02J 7/00* (2006.01)

(52) U.S. Cl.
USPC .............................. 320/107; 320/112; 320/119

(58) Field of Classification Search .................. 320/107, 320/112–119
See application file for complete search history.

(56) References Cited

U.S. PATENT DOCUMENTS

| | | | | |
|---|---|---|---|---|
| 2,904,739 A * | 9/1959 | Reed, Jr. | | 320/107 |
| 5,610,495 A * | 3/1997 | Yee et al. | | 320/116 |
| 6,803,745 B2 * | 10/2004 | Nishida et al. | | 320/112 |
| 7,642,749 B2 * | 1/2010 | Nishida | | 320/119 |
| 2007/0075681 A1 * | 4/2007 | Takagi et al. | | 320/128 |
| 2008/0238360 A1 * | 10/2008 | Stone et al. | | 320/107 |
| 2009/0243540 A1 * | 10/2009 | Choi et al. | | 320/107 |
| 2011/0254499 A1 * | 10/2011 | Wolf et al. | | 320/107 |
| 2011/0291611 A1 * | 12/2011 | Manor | | 320/107 |

* cited by examiner

*Primary Examiner* — Jay Patidar

(57) ABSTRACT

A plurality of serially connectable lithium based batteries provide power to a load upon actuation of a user operated switch. Upon actuation of the user operated switch, additional switches intermediate adjacent batteries close to serially connect the batteries to one another and a load. A signal from the load maintains these additional switches closed. A charging circuit is associated with each battery to charge the batteries in parallel upon opening the additional switches. Sensors for temperature, current and various other parameters provide signals to one or more controllers to prevent damage upon the presence of a fault indication signal.

12 Claims, 4 Drawing Sheets

*Serially connected battery architecture with chargers.*

*Alternate embodiment of battery architecture to achieve parallel, and if needed, independent charging of serially connected battery cells.*

*Preferred embodiment of battery architecture to achieve parallel, and if needed, independent charging of serially connected battery cells.*

*Preferred embodiment of serially connected battery with parallel charging ability with sensors.*

*Serially connected battery architecture with chargers.*

MONITOR FOR CHARGING SERIES CONNECTED BATTERIES

CROSS REFERENCE TO RELATED APPLICATIONS

The present invention claims priority to the disclosure contained in provisional application entitled "MONITOR FOR CHARGING SERIES CONNECTED BATTERIES" filed Sep. 30, 2008 and assigned Ser. No. 61/101,591.

BACKGROUND OF THE INVENTION

1. Field of the Invention

The present invention relates to circuits for charging batteries and, more particularly, to load generated signals for maintaining batteries serially connected or for disconnecting the batteries from one another to permit charging each individual battery.

2. Description of Related Prior Art

Recently developed lithium polymer (LI-PO), lithium ion (LI-ION), and possibly other lithium based batteries (hereinafter collectively referred to as lithium battery) have a high power density which renders them preferable in applications where the size versus energy ratio must be as small as possible. As the chemistry of batteries has been changing, it is inevitable that the methodology for charging these batteries must change to render the charging procedure as effective and as safe as possible. Moreover, the charging circuits must be configured to minimize unacceptable heating of the batteries, afford relatively rapid charging and terminate charging when a full charge is achieved.

Lithium based batteries have become very popular and have been used in numerous applications in both consumer and commercial products because of their relatively small size, and light weight relative to their electrical energy capacity. Regrettably, numerous instances of these lithium batteries catching fire, or even exploding, have been reported. Typically, such fire/explosion has occurred due to an externally induced shorting of the battery resulting in discharge of a significant current and commensurate heating of the battery. Internal shorting due to poor battery manufacturing processes or lack of manufacturing controls has also been responsible for many of the fires/explosions. Other causes include poor charging and discharging methodologies.

While internal shorting of a lithium battery is essentially impossible to control by a user as it relates to design, configuration and manufacturing processes of the lithium battery, some degree of protection against it can be accomplished by proper selection of battery packaging material such as sheet metal, flame retardant material or material with high melting temperature. Further, packaging material with appropriate characteristic and strength can contain the effects of an exploding lithium battery.

Effects of external shorting of a lithium battery pack can also be contained with proper selection of packaging material as well as with usage of fuse, both resettable and non-resettable. However, the ideal approach to mitigating the effects of external shorting is to prevent it from happening.

During charging of a multi cell lithium battery a defective cell may cause high current flow and commensurate heating of one or more remaining cells with attendant risk of fire or explosion. This situation may even arise if one or more of the cells is at a voltage substantially less than the remaining cells. To avoid this problem, the chargers used are preferably connected to each individual cell and the charge rate (current) applied is a function of the voltage of the cell; quite often a charger can also monitor the voltage of each cell during the charging process. Thereby, the capacity and voltage of each of the cells can be maintained essentially uniform and avoid excessive heating, fire and explosion.

SUMMARY OF THE INVENTION

Serially connectable batteries in a battery pack are normally disconnected from one another or open circuited when not in use to prevent shorting of the batteries due to external factors. Each battery has its own charging circuit. By actuating a user controlled switch, the batteries become serially connected to a load. Thereafter, the load generates a signal to maintain the batteries serially connected. In the event of a fault, such a signal would terminate and the serially connected batteries would become disconnected from one another to prevent a short across the output terminals of the battery pack. As each battery includes its own charger, a fault on one battery will have no effect upon the charge delivered to another battery and problems of over-charging and over-heating of the battery pack due to a poorly or a non-functioning battery become non-existent.

It is therefore a primary object of the present invention to provide serially connected batteries dependent on a signal from a load to remain connected.

Another object of the present invention is to provide a user activated switch for initially serially connecting batteries of a battery to one another and to a load.

Yet another object of the present invention is to provide a separate charger for each battery of serially connectable batteries to prevent over-charging and over-heating of one or more of the batteries.

Still another object of the present invention is to provide sensors for sensing various unacceptable conditions that may be present in any battery of a battery pack during both discharging and charging of the batteries.

A further object of the present invention it to provide a shut off capability upon occurrence of a fault or signal from a load to disconnect each battery of a set of serially connected batteries from each other and from the load.

A yet further object of the present invention is to provide a method for controlling the charging and discharging of batteries serially connectable to a load.

A still further object of the present invention is to provide a method for individually charging each battery of serially connectable batteries to prevent over-charging and over-heating of any of the batteries.

These and other objects of the present invention will become apparent to those skilled in the art as a description thereof proceeds.

BRIEF DESCRIPTION OF THE DRAWINGS

The present invention will be described with greater specificity and clarity with reference to the following drawing, in which.

DESCRIPTION OF THE PREFERRED EMBODIMENT

Figure 2:
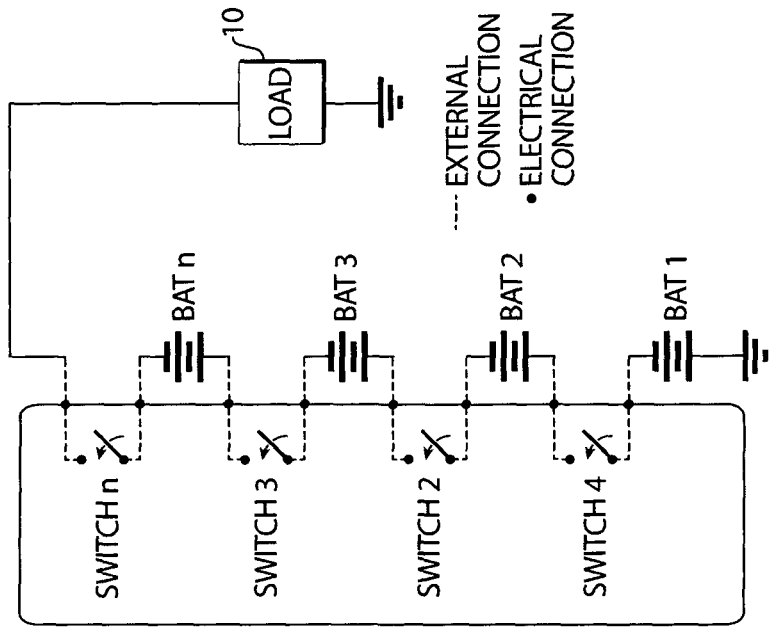
FIG. 2 is a circuit diagram illustrating externally mounted switches for serially connecting and disconnecting the batteries from one another and the load.
Figure 1:
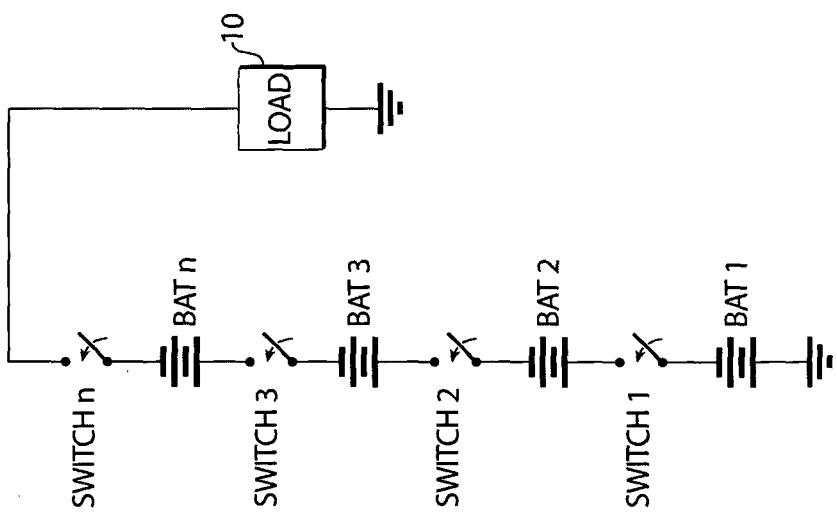
FIG. 1 is a circuit diagram illustrating serially connectable batteries with switches for disconnecting the batteries from one another and the load.

Referring to FIG. 1, there is illustrated a basic circuit depicting a plurality of lithium batteries (Bat1, Bat2, Bat3, Bat n . . . ) connected in series to a load 10. A plurality of switches (Switch 1, Switch 2, Switch 3, Switch n . . . ) are disposed intermediate the batteries to segregate the batteries form one another, including a switch (Switch n) disposed between battery Bat n and load 10. Each battery may be formed of one or more battery cells connected in a series. In view of the beneficial parameters of each member of the family of batteries generally referred to as lithium batteries (such as lithium polymer, lithium ion, etc.), the batteries depicted herein are preferably of this type. Each of the switches may be any of various electrical types, such as a diode, transistor, optocouple, etc. or maybe mechanical, such as relays. Moreover, the last switch, Switch n, may or may not be used as a function of whether it is preferable to retain battery Bat n, connected to or isolated from load 10.

By inspection, it will become evident that upon the closing of each of the switches, the batteries are serially connected across the load. Similarly, upon opening each of the switches, each of the batteries is isolated from an adjacent battery.

Preferably, Switches 1, 2, 3, n . . . are mounted on the same circuit board as the batteries. However, there may be practical considerations for mounting each of the switches at a remote location. The drawback of such remote location relates to potential parasitic impedances that may be introduced that can affect charging, discharging, usage and/or perceived performance of the batteries. The remote location discussed above is identified by numeral 12. The electrical conductors interconnecting the switches with the respective terminals of the batteries are depicted by dashed lines and the solid dots represent electrical connections between the electrical conductors interconnecting the batteries with their respective switch.

Figure 3:
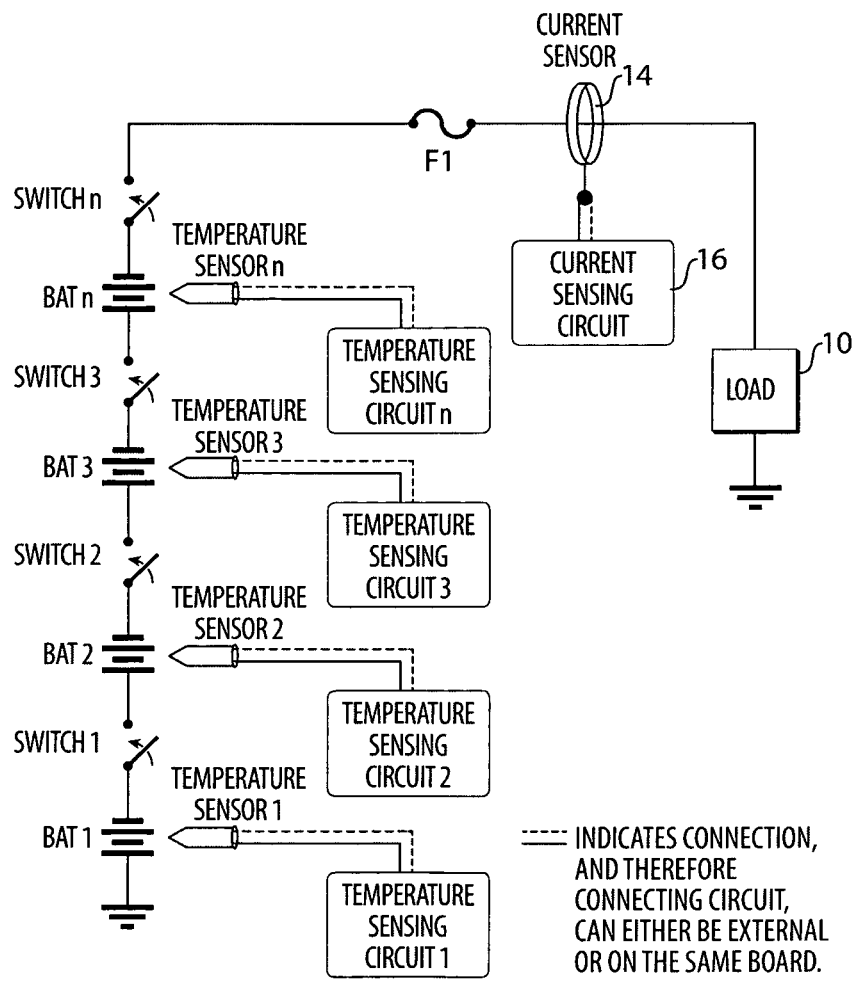
FIG. 3 illustrates temperature sensors associated with each battery of serially connectable batteries and a current sensor.

Lithium batteries, whether of the lithium polymer (Li-Po) or lithium ion (Li-Ion) (and other lithium based batteries) have the potential of creating hazardous conditions during either charging or discharging of the batteries. Referring to FIG. 3, there is shown further architecture to assuage development of such hazardous conditions. One of the dangers of lithium batteries is that of rapid heat buildup during either charging or discharging of the battery cell. This heat buildup may cause a fire or an explosion if sufficiently severe. One mechanism for protecting against the effects of such fire or explosion is that of locating the lithium batteries within a protective enclosure of aluminum or other sufficiently robust and/or fire insensitive material. This additional mechanical structure is a disadvantage with regard to the necessary volumetric demand imposed and the attendant weight. To reduce the possibility of excessive heat generation, one or more temperature sensors (Sensor 1, Sensor 2, Sensor 3, Sensor n) may be associated with each battery, as depicted in FIG. 3. Such temperature sensor may be a simply conventional thermocouple or other more sophisticated device. Each temperature sensor is coupled to a temperature sensing circuit (Circuit 1, Circuit 2, Circuit 3, Circuit n) to provide an output signal reflective of the temperature sensed. Such signal may be used to terminate or otherwise control the charging and discharging of the respective battery to prevent a potentially hazardous condition. Additionally, a current sensor 14 may be used attendant the electrical conductor conveying electrical power to load 10. An associated current sensing circuit 16 may generate a signal as a function of the current sensor reflective of the value of the current flowing to load 10. An output signal from this current sensing circuit may be used to control operation of one or more Switches 1, 2, 3, n . . . and terminate further current flow in the event of a potentially hazardous condition. Additionally, a fuse F1 may be incorporated to disconnect the load from the batteries as a function of whether a current in excess of a predetermined limit is present.

Each of the temperature sensing circuits may be remotely located from the respective temperature sensor or may be mounted on a circuit board in close proximity to the respective temperature sensor to minimize any detrimental effect of the attendant electrical conductors. This capability is presented by the solid and dashed lines interconnecting each temperature sensor with its temperature sensing circuit.

If a lithium battery includes more than one cell, certain charging conditions must be met to prevent creation of a hazardous condition due to overheating. That is, if a cell of two or more cells attendant a lithium battery is at a voltage significantly below that of other cells, a charger may cause a significant charging current to flow. Such significant charging current will cause a heat buildup in any higher voltage cell and create a potentially hazardous condition. Preferably, a charger for a lithium battery charges each cell of the battery independently while simultaneously monitoring the voltage of each cell to ensure that all cells are at the same voltage upon completion of a charge.

Figure 4:
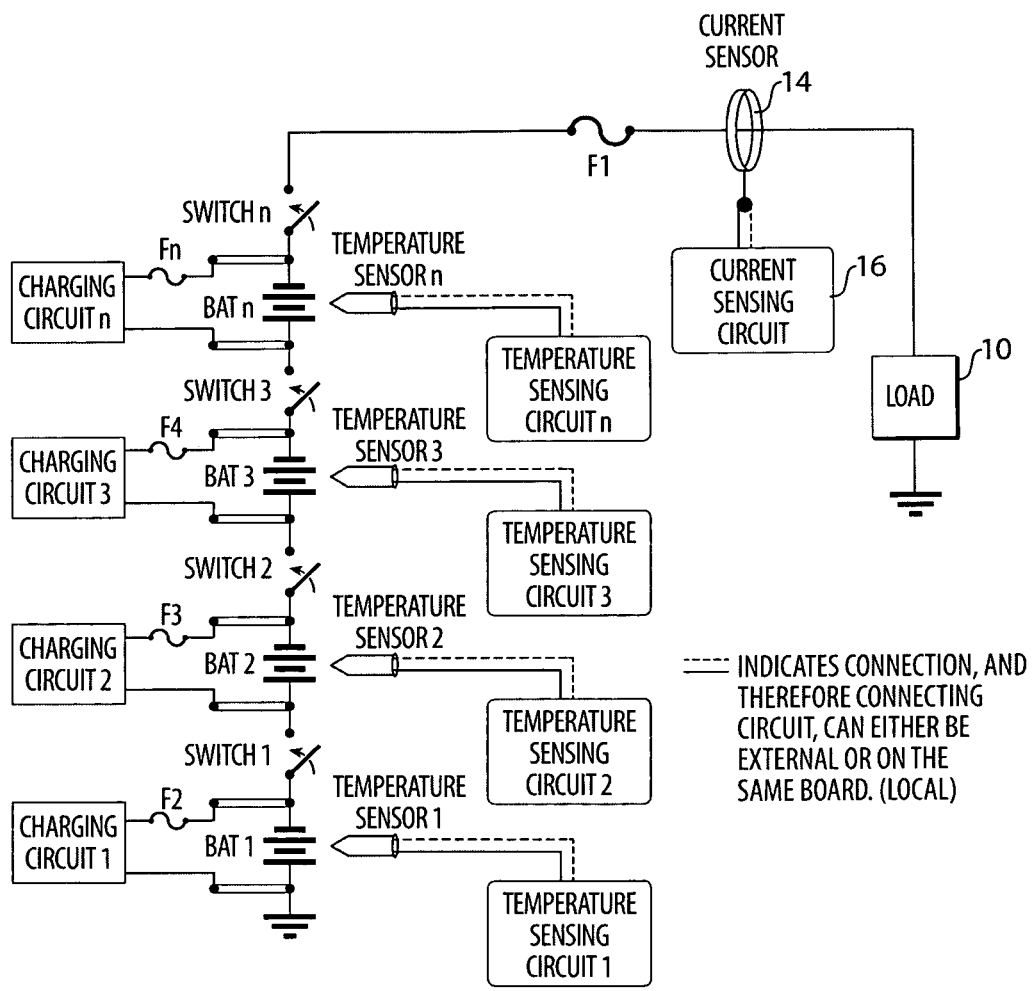
FIG. 4 illustrates the circuit shown in FIG. 3 with a charging circuit associated with each battery.

Referring to FIG. 4, there is illustrated the circuitry shown in FIG. 3 with the addition of Charging Circuit 1, Charging Circuit 2, Charging Circuit 3, Charging Circuit n electrically connected across a respective battery, Bat 1, Bat 2, Bat 3, Bat n. Preferably, a fuse such as fuses F2, F3, F4, Fn, are disposed in connection with the respective charging circuit to limit the maximum charge current that can exist. These charging circuits may be on the same circuit board as the batteries or they may be remotely located therefrom, as depicted by the solid and dashed lines along with the black dots representing connections of the attendant electrical conductors.

During charging of the batteries, each of the switches Switch 1, Switch 2, Switch 3, Switch n are open and the batteries are no longer serially connected. As illustrated, FIG. 4 presents the basic architecture for serially connectable batteries to provide electric power to a load and provide the capability of parallel charging each battery.

Figure 5:
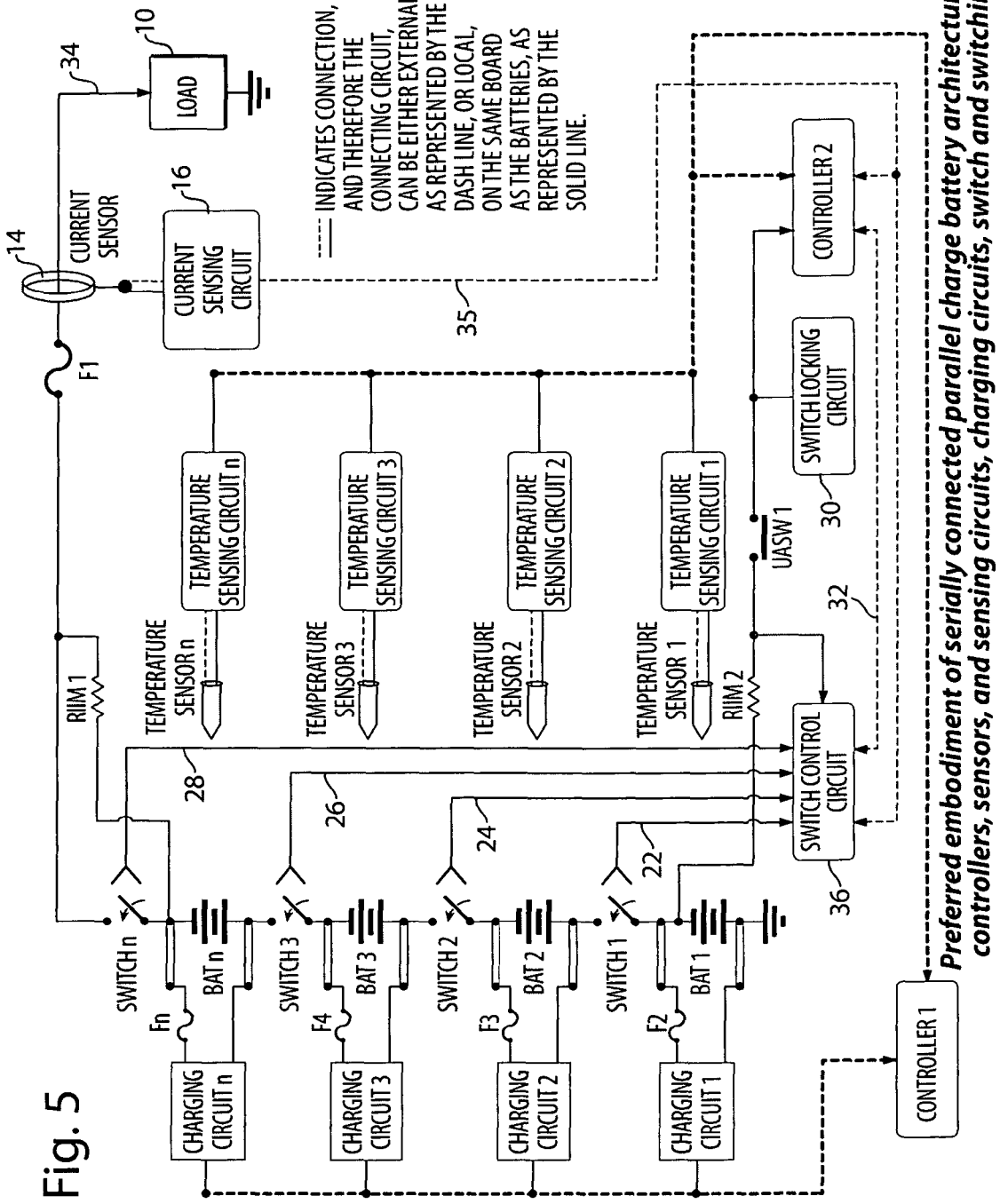
FIG. 5 illustrates the circuit shown in FIG. 4 with controllers for controlling the operation of serially connectable independently chargeable batteries.

The architecture shown in FIG. 5 includes the basic circuitry shown in FIG. 4 along with circuitry and elements for controlling the operation of providing electric power to load 10 from serially connected batteries while maintaining the capability of charging each battery independently. More particularly, controllers are needed for the following functions: each of the switches must be either closed or open as a function of whether the batteries are to be connected in series for providing electric power to the load or disconnected from one another during charging or otherwise. Each of the charging circuits must be monitored and controlled along with processing the signals generated by each charger to ensure that a hazardous condition will not come about. The temperature sensing circuits must be monitored and the signals generated therefrom must be processed. Similarly, the current sensing circuit(s) must be monitored and the signals generated therefrom must be processed. To perform these functions, controllers 1 and 2 are embodied.

As depicted by the dashed lines, these controllers may be mounted on a common circuit board with the batteries etc., or at a remote location. The function of controller 1 is primarily that of monitoring and controlling the charging circuits and monitoring the temperature sensing circuits. The primary function of controller 2 is that of controlling operation of the switches, as well as monitoring the current sensing circuits and the temperature sensing circuits in order to determine operation of the respective switches. Preferably, power for controller 1 is provided from an external source and the power for controller 2 may be provided from the batteries it is sensing and controlling; however, this power may be provided by an external source.

The architecture for monitoring and charging the batteries independently of a serially connected battery pack is represented in FIG. 5. Normally, the batteries forming a battery pack are not interconnected. Thereby, the battery pack cannot be externally shorted and thus cannot cause a hazardous condition resulting from external shorting. Such shorting, if permitted, would lead to overheating of the batteries and potentially causing a fire or an explosion, as discussed above. In the circuitry illustrated in FIG. 5 and as herein described, the operation of switches 1, 2, 3, n . . . are controlled by a specifically generated signal. Preferably, these switches are of low resistance components such as transistors, mosfets, relays, etc. The initial signal to close the switches may be manually generated by a user activated switch UASW1. Upon actuation of switch UASW1, a signal is generated and transmitted along electrical conductors 22, 24, 26, 28 to close switches 1, 2, 3, n. Thereby, the batteries become serially connected across load 10 to provide power to the load. It is to be understood that switch UASW1 could be a latching switch, as represented by switch locking circuit 30. However, a better approach applied in the present invention is that of having controller 2, upon receipt of power from the batteries generate signals via conductor 32 to control operation of switches 1, 2, 3, n. Furthermore, controller 2 may be incorporated with load 10 and receive power directly via conductor 34. In the event of a fault, time limit of operation, or other cause for terminating operation, self termination of this part of the operation with this architecture can occur. For example, in the event the that load is shorted, controller 2 would generate a signal to switch control circuit 36 and cause switches 1, 2, 3, n to open and thereby terminate current flow to the load. Furthermore, it is preferable for controller 2 to receive a signal from the load in the manner of a control signal to cause controller 2 to generate a further signal through switch control circuit 36 to maintain switches 1, 2, 3, n in the closed state. Thereby, the presence or absence of electrical power delivered or not delivered to the load is used as a function to control the state of switches 1, 2, 3, n. It is to be noted that if switch UASW1 is of the latching type, the attendant switch locking circuit 30 would receive a signal from controller 2 to unlatch switch UASW1 in the event of a short or lack of electrical power delivered to the load.

It is to be understood that controller 2 could embody a microprocessor or other component that, upon startup, provides an output signal to keep and maintain the batteries serially connected. Such operation removes the requirement of a user to exert an influence upon or UASW1 switch.

To enhance safe operation of the batteries in the event an external influence causes the batteries to become connected in series, current limiting resistor RLIM1 is incorporated into the architecture. This resistor will prevent a short circuit from occurring and permit the batteries to be drained within the range of its rated current. It is to be noted that resistor RLIM1 can only be bypassed by an externally generated signal coming from the load. Because this signal can be intentionally or unintentionally generated, a further precaution is embodied in the nature of a resettable or nonresettable fuse F1. This fuse also serves the function of preventing damage in the unlikely event that the batteries are externally shorted.

A further current limiting resistor, RLIM2, is used to prevent any hazardous condition to occur as a result of a potential short that may be experienced by the circuit. Further precautions are also embodied in this architecture. The temperature sensors discussed above may be used in combination with non-resettable fuses to disengage the batteries if the temperature sensed exceeds specifications. That is, the output from one or more of the temperature sensors can be used to shut down the battery pack by first using the power of the battery pack to remove or short out any externally or internally generated signal or to prevent the externally or internally generated signal from becoming connected to any specific component in this architecture. By using non-resettable fuses, an open circuit condition can be created between the externally or internally generated signal and the battery pack or to short such signal would have the effect of disconnecting the batteries. It may be noted that any signal generated by the temperature sensors can be implemented by the load or the batteries themselves to terminate the serial connection of the batteries.

Because the batteries within the battery pack are normally not serially connected, the terminals of the battery pack may come into contact with an electrically conductive medium without fear of a high-current flow thereacross as there is no voltage present across these terminals.

To reiterate, the batteries of the battery pack are normally not connected in series. This permits each battery cell or cells to by independently charged, monitored or shut down. This has several advantages. Were the batteries connected in series, a certain danger exists. For example, should one of the batteries be faulty then one or more batteries might become overcharged which would result in overheating and possible explosion or fire. By charging the cell of each battery each cell can be monitored and any shorted battery cell can be quickly detected and further charging terminated. Each of charging circuits 1, 2, 3, n used in conjunction with batteries Bat 1, Bat 2, Bat 3, Bat n, respectively, may be packaged as part of the battery pack or each of these chargers may be external to the battery pack with appropriate interconnections therewith. Fuses F2, F3, F4, Fn provide a safeguard against an unacceptable high current. Like the chargers, these fuses may be part of each respective charger or each respective battery or battery cell. During charging of the battery cells, a lockout signal or other signal may be generated by controller 2 to prevent serial connection between the batteries.

I claim:

1. Apparatus for charging batteries configured to be serially connected, said apparatus comprising in combination:
   a) a plurality of batteries;
   b) a plurality of switches having a first state for interconnecting adjacent ones of said batteries to selectively serially connecting said batteries and a second state to disconnect said serially connected batteries from one another;
   c) plurality of battery chargers each connected to each battery of said plurality of batteries for charging the respective one of said plurality of batteries;
   d) a current sensor for sensing current flow to a load and for generating a signal to retain said plurality of switches in the first state; and
   e) a controller for selectively energizing each of said chargers when said plurality of switches are in the second state;
   f) one of a plurality of temperature sensors for sensing the temperature of each battery of said plurality of batteries and g) a further controller for controlling operation of each battery charger of said plurality of battery chargers in response to the signals received from each temperature sensing circuit of said plurality of temperature sensing circuits.

2. The apparatus as set forth in claim 1 including a manually operated switch for switching said plurality of switches to the first state.

3. The apparatus as set forth in claim 2 including a switch locking circuit for latching said manually operated switch.

4. The apparatus as set forth in claim 1 including a fuse associated with each charger of said plurality of chargers for limiting the charging current.

5. The apparatus as set forth in claim 1 including a switch control circuit for controlling the operation of said plurality of switches.

6. The apparatus as set forth in claim 5 including a controller for controlling operation of said switch control circuit.

7. The apparatus as set forth in claim 1 including said controller for controlling operation of said plurality of switches and wherein each of said plurality of temperature sensors provides an output signal to said controller for affecting operation of said plurality of switches.

8. A battery pack for providing power to a load, said battery pack comprising in combination: a) a plurality of batteries serially connected through a plurality of switches; b) a plurality of chargers, each of said chargers being configured for charging one of said batteries; c) a fuller switch for switching said plurality of switches to a first state to serially interconnect said plurality of batteries; d) a current sensor for sensing current flow to the load and configured for maintaining said plurality of switches in the first state; e) a control circuit for switching said plurality of switches from the first state to a second state to disconnect the batteries from one another; and f) said control circuit being configured to activate said plurality of chargers to charge the respective ones of said plurality of batteries.

9. The battery pack as set forth in claim 8 including a temperature sensor and temperature sensing circuit responsive to each battery of said plurality of batteries for generating a signal and provided to said control circuit to switch said plurality of switches to the second state in response to the temperature sensed.

10. The battery pack as set forth in claim 9 including a least one controller responsive to said temperature sensors and said current sensor for controlling operation of said switches and said battery chargers.

11. The battery pack as set forth in claim 8 including a manually operated switch for actuating said plurality of switches to switch from the second state to the first state.

12. The battery pack as set forth in claim 11 including a latching circuit for maintaining said manually operated switch closed.

* * * * *